(12) United States Patent
Atallah

(10) Patent No.: US 8,032,469 B2
(45) Date of Patent: Oct. 4, 2011

(54) RECOMMENDING SIMILAR CONTENT IDENTIFIED WITH A NEURAL NETWORK

(75) Inventor: Antoine J Atallah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 762 days.

(21) Appl. No.: 12/115,886

(22) Filed: May 6, 2008

(65) Prior Publication Data

US 2009/0281975 A1    Nov. 12, 2009

(51) Int. Cl.
*G06N 3/02* (2006.01)
(52) U.S. Cl. .......................................... 706/18
(58) Field of Classification Search ............... 706/18
See application file for complete search history.

(56) References Cited

U.S. PATENT DOCUMENTS

| | | | | |
|---|---|---|---|---|
| 5,995,652 | A | 11/1999 | Chiu | |
| 6,189,002 | B1 | 2/2001 | Roitblat | |
| 6,295,514 | B1 * | 9/2001 | Agrafiotis et al. | 703/12 |
| 6,304,864 | B1 | 10/2001 | Liddy | |
| 6,701,318 | B2 | 3/2004 | Fox | |
| 6,738,760 | B1 | 5/2004 | Krachman | |
| 7,188,055 | B2 * | 3/2007 | Agrafiotis et al. | 703/2 |
| 7,296,009 | B1 | 11/2007 | Jiang | |
| 7,398,259 | B2 * | 7/2008 | Nugent | 706/33 |
| 2003/0212663 | A1 | 11/2003 | Leno | |
| 2005/0055340 | A1 | 3/2005 | Dresden | |
| 2005/0086214 | A1 | 4/2005 | Seewald | |
| 2005/0102251 | A1 | 5/2005 | Gillespie | |

OTHER PUBLICATIONS

Relevance Feedback Technique for Content-Based Image Retrieval using Neural Network Learning, Bing Wang; Xin Zhang; Na Li; Machine Learning and Cybernetics, 2006 International Conference on Digital Object Identifier: 10.1109/ICMLC.2006.258628 Publication Year: 2006, pp. 3692-3696.*
Identifying emotion topic—An unsupervised hybrid approach with Rhetorical Structure and Heuristic Classifier, Das, D.; Bandyopadhyay, S.; Natural Language Processing and Knowledge Engineering (NLP-KE), 2010 International Conference on Digital Object Identifier: 10.1109/NLPKE.2010.5587777 Publication Year: 2010, pp. 1-8.*
Yamaguchi, Kouichi, "A Neural Network Controlled Adaptive Search Strategy for HMM-Based Speech Recognition", 1993, http://ieeexplore.ieee.org/iel2/1051/7685/00319374.pdf?isnumber=7685&prod=CNF&arnumber=319374&arSt=592&ared=585+vol.2&arAuthor=Yamaguchi$2C+K.
Bing Wag, Xin Zhang, Na Li, "Relevance Feedback Technique for Content-Based Image Retrieval Using Neural Network Learning", 2006, http://ieeexplore.ieee.org/iel5/4028021/4028022/04028712.pdf?tp=&isnumber+&arnumber=4028712.

* cited by examiner

*Primary Examiner* — Michael B Holmes
(74) *Attorney, Agent, or Firm* — Shook, Hardy & Bacon L.L.P.

(57) ABSTRACT

Methods, systems and computer-readable media for finding similarities between visual objects by evaluating user interactions with a collection of visual objects are provided. Using a neural network, human interactions with a collection of visual objects are evaluated to ascertain relationships or connections between visual objects. The relationship between visual objects indicates that the visual objects are similar. Once relationships between visual objects are identified, a user may select one or more visual objects and receive suggested visual objects that are similar to the one or more visual objects selected by the user.

14 Claims, 8 Drawing Sheets

RECOMMENDING SIMILAR CONTENT IDENTIFIED WITH A NEURAL NETWORK

BACKGROUND

Vast collections of visual objects, such as photographs and clip art, are presently available to users through online databases. Users may access the collections by navigating to a web site associated with one or more collections and submitting a search query. In response to the search query, the web site will present visual objects that are responsive to the query. In some instances, the web site determines that a visual object is responsive to a query by evaluating keywords that have been assigned to a visual object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to finding similarities between visual objects by evaluating user interactions with a collection of visual objects. The concept of similarity is a subjective one and difficult for a computer to identify. Using a two-layer neural network, human interactions with a collection of visual objects can be evaluated to ascertain relationships or connections between visual objects. For a very simplistic example, if a user enters a search query and selects three visual objects in response to the search query, then a relationship could be formed between the three selected visual objects. The neural network may evaluate numerous such interactions to identify relationships between visual objects in a collection. Visual objects that are related are determined to be similar to one another. Once relationships between visual objects are identified, they may be used to suggest additional objects to a user that are similar to objects selected by a user. The relationships identified by the neural network may be much subtler than those typically reflected in the choice of keywords associated with a visual object.

BRIEF DESCRIPTION OF THE DRAWINGS

The present invention is described in detail below with reference to the attached drawing figures, wherein.

DETAILED DESCRIPTION

Figure 1:
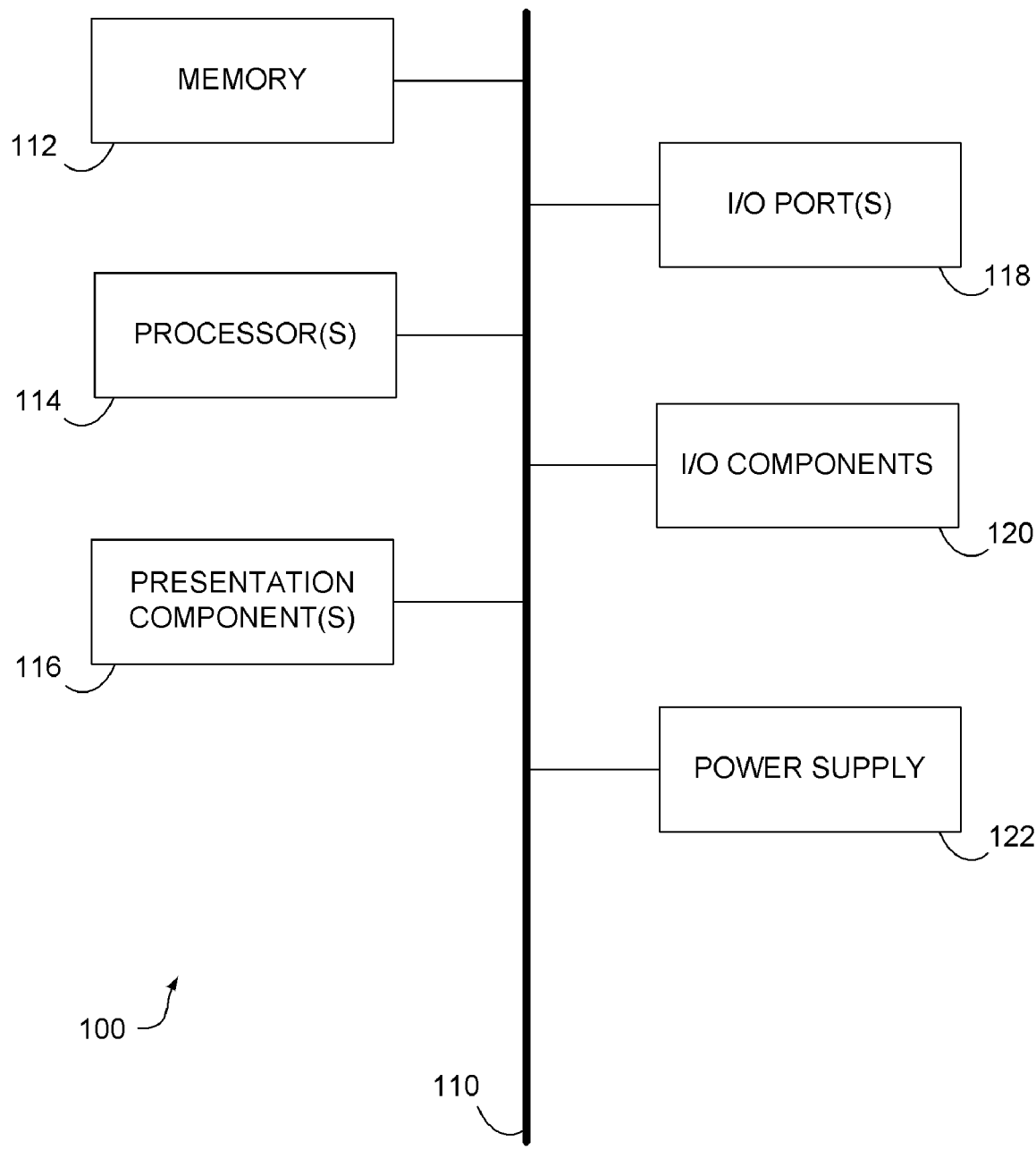
FIG. 1 is a block diagram of an exemplary computing environment suitable for implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Accordingly, in one embodiment, one or more computer-readable media having computer-executable instructions embodied thereon for performing a method of finding similar visual objects within a plurality of visual objects is provided. The method includes storing the plurality of visual objects in a data store, wherein each visual object within the plurality of visual objects includes an identifier and visual content. The method also includes storing a neural network that includes a plurality of nodes, wherein each node in the neural network is associated with an individual visual object in the plurality of visual objects, wherein each node includes at least one similarity coefficient that indicates a degree of similarity between the node and another node. The method further includes receiving a first selection of a first visual object from a user, wherein the first visual object is one of the plurality of visual objects. The method also includes determining that a second visual object is similar to the first visual object because a similarity coefficient between a first node and a second node indicates that the second visual object is similar to the first visual object, wherein the first node corresponds to the first visual object and the second node corresponds to the second visual object. The method further includes communicating the second visual object for presentation to the user.

In another embodiment, a computerized system, including one or more computer-readable media, containing a two-layer neural network for finding similar visual objects within a plurality of visual objects. The system includes the two-layer neural network containing a plurality of nodes that are linked by similarity coefficients. Each node is associated with a visual object in a data store. A sum of the similarity coefficients associated with the each node must equal a first number or zero, wherein if the sum of the similarity coefficients is zero for a single node then the single node is not related to any other nodes in the two-layer neural network. The system also includes a similarity search component for receiving a selection of one or more selected visual objects that are each associated with a corresponding node, identifying one or more similar visual objects by evaluating the similarity coefficients associated with the each node associated with each of the one or more selected visual objects, and causing the one or more similar visual objects to be presented to a user.

In yet another embodiment, a method for training a neural network to determine that a first visual object is similar to a second visual object is illustrated. The method includes receiving a first selection of the first visual object returned in response to a first query and receiving a second selection of the second visual object returned in response to the first query. The method also includes creating a training set including a first identifier for the first visual object as an input and a second identifier for the second visual object as an output. The training set is used to adjust a plurality of similarity coefficients associated with nodes in a neural network so that when the training set input is submitted to the neural network the neural network produces the training set output in response. The method further includes updating a similarity coefficient from a first node in the neural network that corresponds to the first visual object to a second node in the neural network that corresponds to the second visual object, so that the similarity coefficient between the first node and the second node is provided.

Having briefly described an overview of embodiments of the present invention, an exemplary operating environment suitable for use in implementing embodiments of the present invention is described below.

Exemplary Operating Environment

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Exemplary System Architecture

Figure 2:
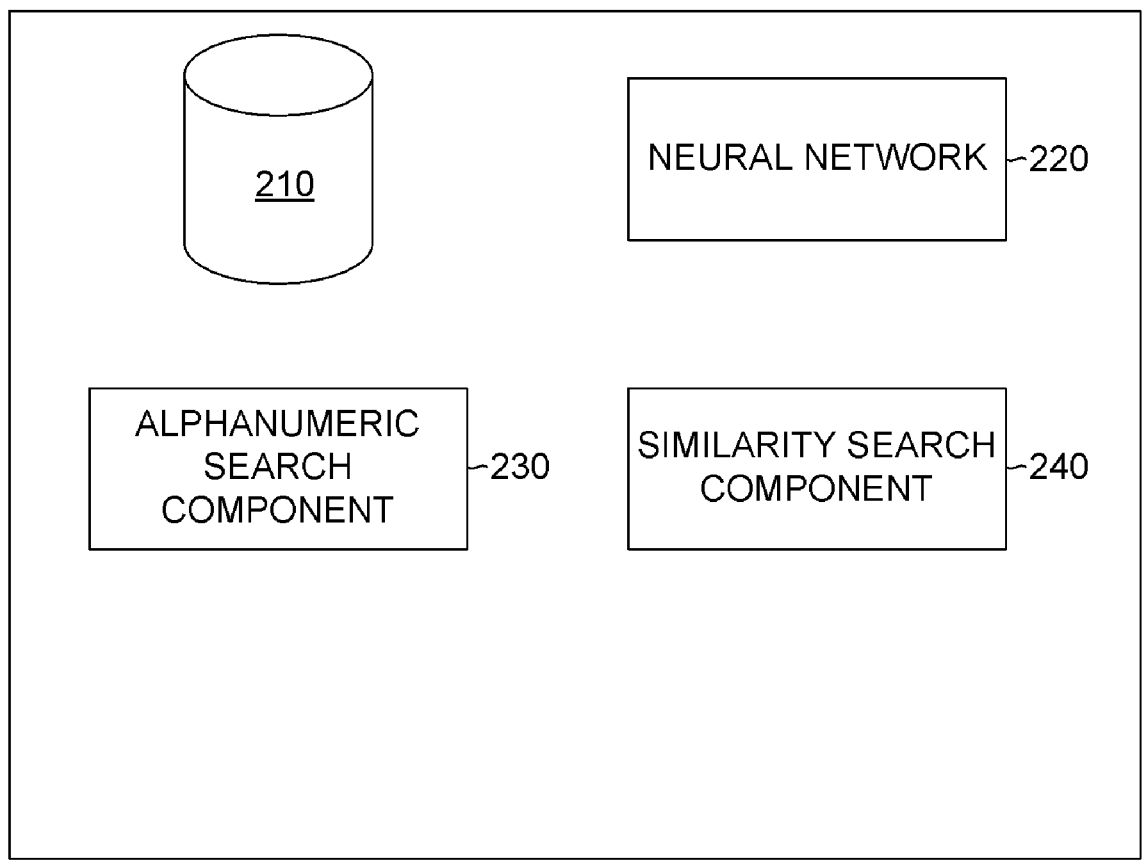
FIG. 2 is a block diagram of exemplary computing system suitable for implementing embodiments of the present invention.

Turning now to FIG. 2, a block diagram is illustrated that shows an exemplary computing system architecture 200 suitable for finding similarities between visual objects by analyzing user interactions with the visual objects, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of the use or functionality of the present invention. Neither should the computing system architecture 200 be interpreted as having any dependency or requirement related to any single component/module or combination of component/modules illustrated therein.

Computing system architecture 200 includes a data store 210, a neural network 220, an alphanumeric search component 230, and a similarity search component 240. Computing system architecture 200 may reside on a single computing device, such as computing device 100 shown in FIG. 1. In the alternative, computing system architecture 200 may reside in a distributed computing environment that includes multiple computing devices coupled with one another via one or more networks. Such networks may include, without limitation, one or more local area networks (LANs) and/or one or more wide area networks (WANs). Such network environments are commonplace in offices, enterprise/wide computer networks, intranets, and the Internet. Accordingly, the network, or combination of networks, is not further described herein.

Data store 210 stores a collection of visual objects and a plurality of data associated with each visual object in the collection. Data that may be associated with an individual visual object includes a unique object identification, one or more keywords, and usage history. The usage history may include the number of times a visual object has been selected, the users that have selected the visual object, the other objects selected by the user in response to the same query, and other information. The visual objects are electronic files that, when presented on a display device by a compatible program, produce an image that is observable with human eyes. Examples of visual objects include clip art, digital photographs, icons, documents, spreadsheets, and drawings. The content of the visual object may include communicative content such as text. The data store 210 may be in the form of a data base or any other form capable of storing a collection of visual objects and associated data.

Data store 210 may also store search session information. In one embodiment, a single search session starts with the submission of an alphanumeric query and ends when a second query is entered or the user navigates away from the search utility. The search session information may be collected and sent to the data store 210. The search session information may be accessed by a training function in the neural network 220 and used to generate the similarity coefficients for the visual objects.

The neural network 220 uses a two-layer neural network to identify similarities between visual objects within the collection of visual objects in data store 210. A two-layer neural network connects the network input to the network output with a single network equation. The input to neural network 220 is one or more identifiers that correspond to visual objects. The output is one or more different identifiers that correspond to different visual objects. Thus, a user can selected a visual object and, using identifiers, a similar visual object can be returned by the neural network 220.

The neural network 220 may be stored in a data base, text file, or other data structure. Each node in the neural network 220 corresponds with a visual object in the data store 210. Each node may include the unique identifier for the visual object to which it corresponds. Each node will also have a plurality of similarity coefficients that are calculated by the neural network 220. The similarity coefficients for a given node are a measure of the similarity between the visual object associated with the given node and visual objects associated with other nodes. In one embodiment, if the node is related to other nodes in the neural network 220, then the sum of the similarity coefficients for an individual node is a fixed number such as one. If the node is not related to any other nodes, the sum of the similarity coefficients for the node is zero.

For example, neural node 10 could have a similarity coefficient of 0.3 associated with neural node 2, a similarity coefficient of 0.4 associated with neural node 7, a similarity coefficient of 0.2 associated with neural node 12, and a similarity coefficient of 0.1 associated with neural node 5. As can be seen, the sum of the similarity coefficients for neural node 10 is one. If neural node 16 did not have any relationships the sum of neural node 16's similarity coefficients would be zero.

The similarity coefficient between a first node and a second node is calculated by the neural network by evaluating user behaviors. For example, if a user entered a query that returned the first and second node and the user selected both nodes the relationship between the first and second node would be strengthened. The user behaviors are memorialized in one or more training sets that are explained subsequently. In one embodiment, the neural network uses back propagation to generate the similarity coefficients for each node.

The neural network is trained using training sets. Training the neural network is the process of updating the similarity coefficients between nodes. A training set includes at least one input and at least one output. The input is identification information for a visual object and the output is identification information for a second visual object. A training set may include an equal or unequal number of inputs and outputs. For example, a first training set could include three inputs and four outputs. In another example, a second training set includes two inputs and two outputs. In one embodiment, the neural network is trained offline. When the neural network is offline the similarity coefficients may not be analyzed to determine the similarity between nodes. In one embodiment, a reverse propagation equation is used to train the network.

In one embodiment, the input data from the training sets is processed by the neural network 220 to generate a calculated output consisting of one or more nodes. An amount of error is calculated by comparing the calculated output with the training output, since the goal is to match the calculated output with the training output. A back propagation algorithm is used to adjust the similarity coefficients of relevant nodes until the amount of error is within an acceptable range. After the neural network 220 is trained in this fashion the training output will be closer to matching the calculated output.

In one embodiment, similarity coefficients are initially calculated for the nodes in the neural network using the keywords associated with visual objects that correspond to nodes in the neural network 220. Providing an initial value for the similarity coefficients based on keywords allows the neural network 220 to immediately provide relevant results to users. As users interact with the results, the similarity coefficients are recalculated based on the user interactions that are submitted to the neural network in the form of training sets.

The alphanumeric search component 230 receives one or more alphanumeric search criteria and identifies visual objects in the collection using the keywords associated with the visual objects. An alphanumeric search criterion includes letters and numbers. By way of example, an alphanumeric search criterion may be a word, a series of words, a combination of words and numbers, a combination of letters and numbers, or just numbers. A series of words can include related words or unrelated words. In one embodiment, the alphanumeric search criterion is a sentence. The alphanumeric search component 230 may present one or more identified visual objects to a user. The alphanumeric search component 230 may present a search box or other input method for a user to submit an alphanumeric search criteria. An example a user interface incorporating an alphanumeric search component 230 is shown in FIG. 3A.

Figure 3A:
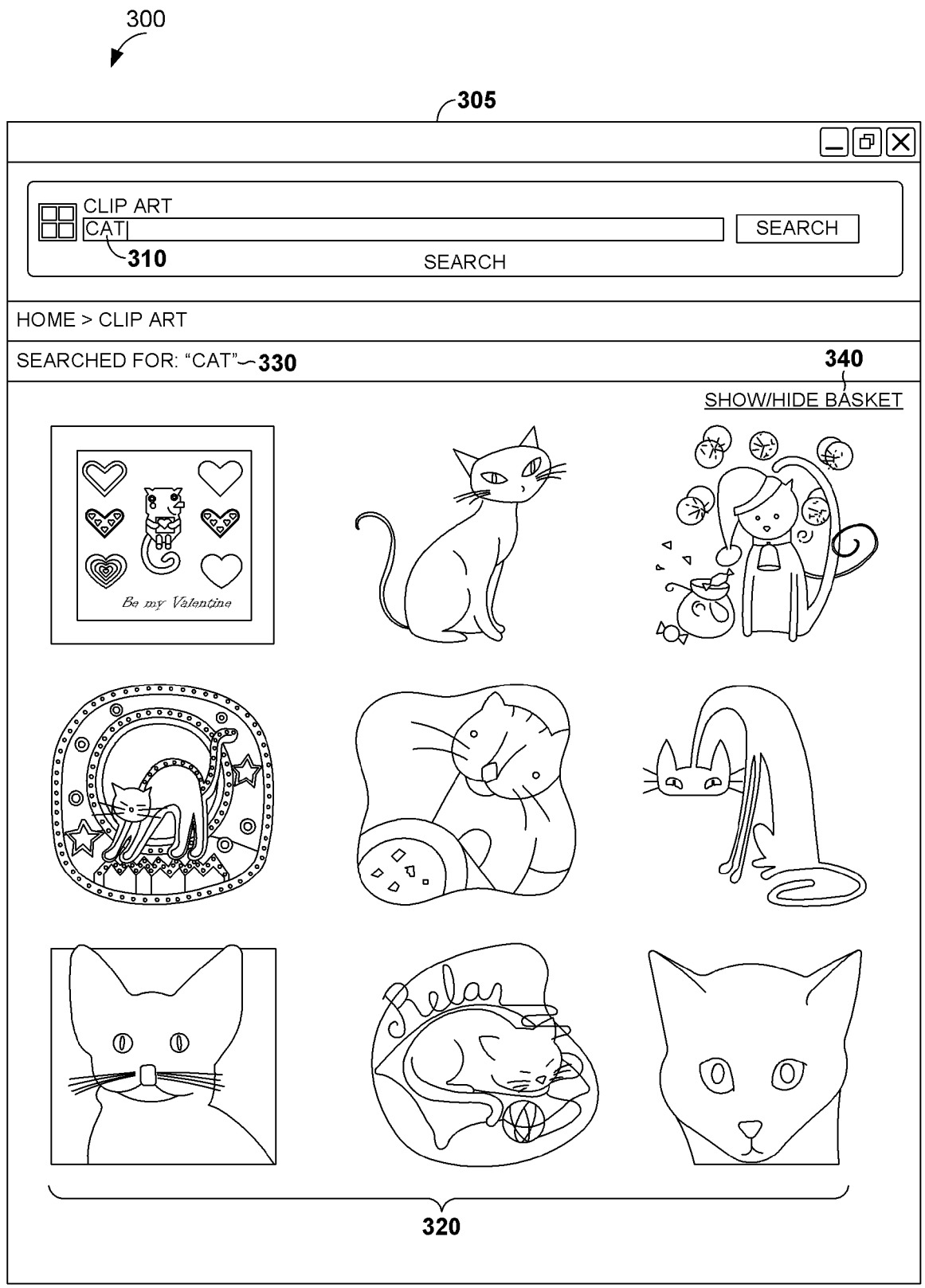
FIGS. 3A-D show an exemplary user interface for receiving search criteria from a user and presenting visual objects that are responsive to the search criteria, in accordance with embodiments of the present invention.

Turning now to FIG. 3A, a user interface 300 suitable for receiving search criteria and presenting visual objects that are responsive to the search criteria is shown, in accordance with an embodiment of the present invention. In one embodiment, user interface 300 is accessed by a user over the Internet and viewed using a browser program. User interface 300 is initially displayed within a primary application window 305. User interface 300 contains search input box 310. In this case, the word "cat" is entered into search input box 310 by a user. In one embodiment, a search engine, such as alphanumeric search component 230, returns a first group of visual objects 320 that are responsive to the search criteria. As can be seen, the first group of visual objects 320 includes visual images containing cats. As described previously, in one embodiment the visual objects are identified by using keywords associated with the visual objects. Other methods, such as image recognition, may also be utilized to identify the subject matter of a visual object. User interface 300 contains a subject heading 330 that reminds the user of the search criteria used to select the first group of visual objects 320. In addition, user interface 300 contains a selection basket icon 340. The selection basket icon 340 opens the selection basket if the selected selection basket is not shown and closes the selection basket if the selection basket is shown. In FIG. 3A, the selection basket is not shown. As explained subsequently with reference to FIG. 3D, the selection basket shows one or more visual objects that have been selected by the user.

Figure 3B:
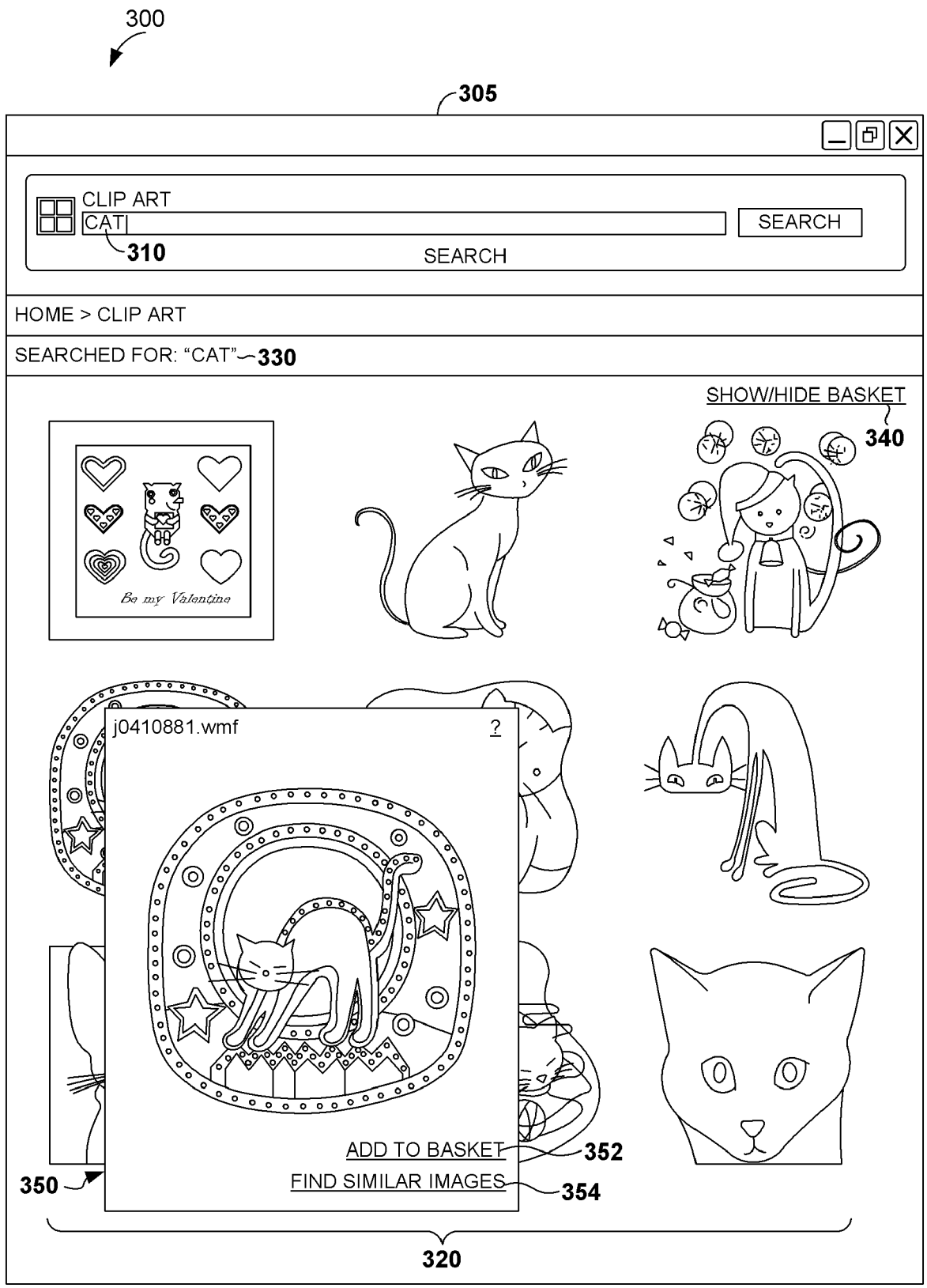

Turning now to FIG. 3B, a user interface 300 showing a response to a user selection of a visual object is shown, in accordance with an embodiment of the present invention. In response to selecting visual object 350, user interface 300 presents visual object 350 in a secondary window 357. The secondary window 357 is presented on top of primary window 305. Secondary window 357 contains an enlarged version of item 350 and two additional icons that allow the user chose additional functions. The first icon is the "add to basket" icon 352 that allows the user to add visual object 350 to the visual objects basket. The second icon, the "find similar objects" icon 354 allows the user to request additional objects based on visual object 350. In one embodiment, the additional objects are selected based on the similarity coefficients within the neural network 220.

Returning to FIG. 2, the similarity search component 240 receives the selection of one or more visual objects and causes other visual objects that are similar to the selected one or more visual objects to be displayed. In one embodiment, a visual object is determined to be similar to the selected visual object based on the similarity coefficient within the neural network 220 between the one or more nodes corresponding with the selected visual objects and other visual objects in the neural network 220. A selected visual object may have similarity coefficients associated with one or more other visual objects. In one embodiment, a relatively high similarity coefficient between two visual objects indicates a strong relationship between the two visual objects. In contrast, a relatively low similarity coefficient between two visual objects indicates a weak relationship between the two visual objects. If there is not a similarity coefficient between two visual objects then the two visual objects are not related. The similarity search component 240 may chose not to display visual objects with a similarity coefficient below a relationship threshold. In another embodiment, only a certain number of visual objects with the highest similarity coefficients are displayed.

In an embodiment where more than one visual object is selected and used to find similar visual objects, an aggregated visual similarity coefficient may be calculated to determine which visual objects have the strongest relationship to the selected objects. An aggregated similarity coefficient may be formed by summing the similarity coefficients between all of the selected visual objects and an unselected visual object. Thus, an aggregated similarity coefficient indicates the strength of relationship between two or more selected objects and a single unselected object. For example, the aggregated similarity coefficient between a first and second selected visual object and a third unselected visual object is calculated by adding the similarity coefficient between the first selected visual object and the third visual object to the similarity coefficient for the second selected visual object and the third visual object. The visual objects with the highest aggregated similarity coefficient have the strongest relationship to the selected visual objects. An example of a user interface using a similarity search component 240 is shown in FIG. 3C.

Figure 3C:
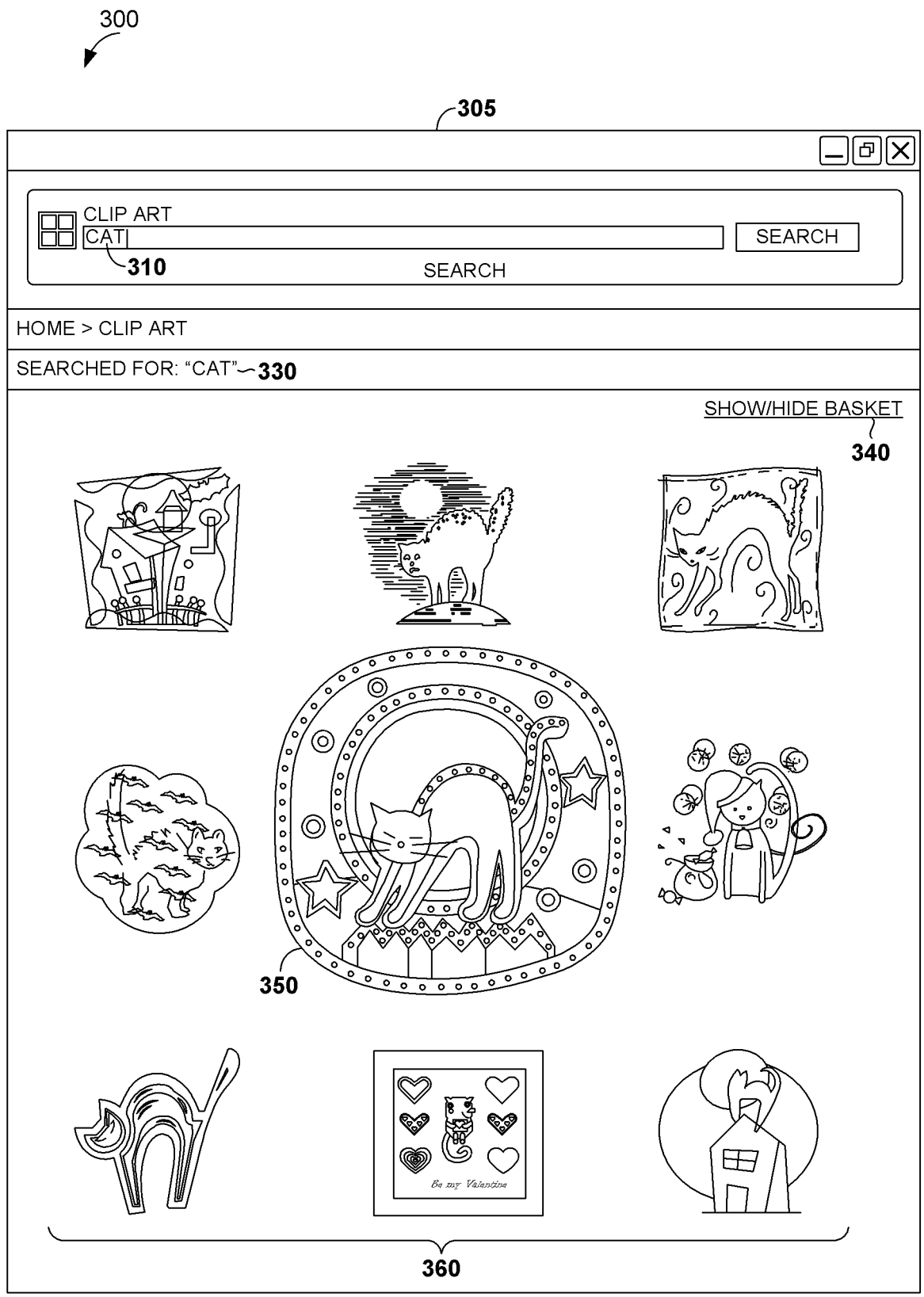

Turning now to FIG. 3C, a user interface 300 showing a selected visual object 350 and a group of suggested visual objects that are related to the selected visual object 350 is shown, in accordance with an embodiment of the present invention. FIG. 3C shows the response to the selection of the "find similar objects" icon 354 in FIG. 3B. As can be seen, the second group of visual objects 360 in FIG. 3C is different than the first group of visual objects 320 in FIG. 3B that was only based on an alphanumeric search term. As described previously, the second group of visual objects 360 includes visual objects determined to be similar to the selected visual object 350 by evaluating the similarity coefficients associated with a node corresponding to visual object 350 in the neural network 220.

Figure 3D:
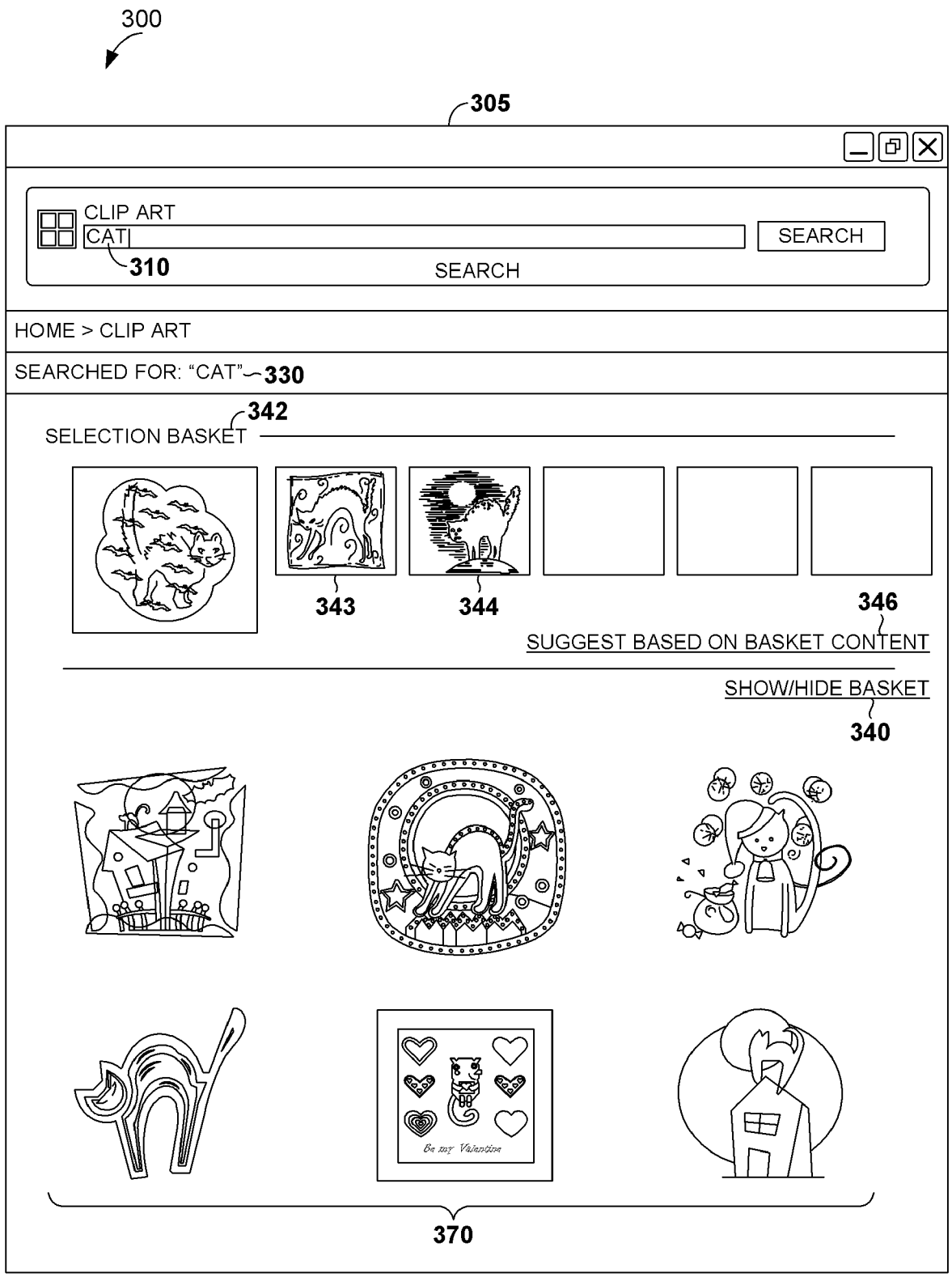

Turning now to FIG. 3D, a user interface 300 that provides suggested visual objects based on two or more selected visual objects is shown, in accordance with an embodiment of the present invention. In FIG. 3D, user interface 300 shows selection basket 342. Selection basket 342 includes selected visual object 343 and selected visual object 344. As described previously, the selection basket may be opened or closed by clicking the selection basket icon 340. The selection basket 342 includes a suggestion icon 346 that allows the user to request additional suggested visual objects based on the visual objects in the selection basket 342. In this case, the third group of visual objects 370 is produced based on a determination that they are related to visual objects 343 and 344. In one embodiment, the third group of visual objects 370 is determined to be related to visual objects 343 and 344 by generating aggregated similarity coefficients for visual objects 343 and 344. The third group of visual objects 370 have the highest aggregated similarity coefficients.

Figure 4:
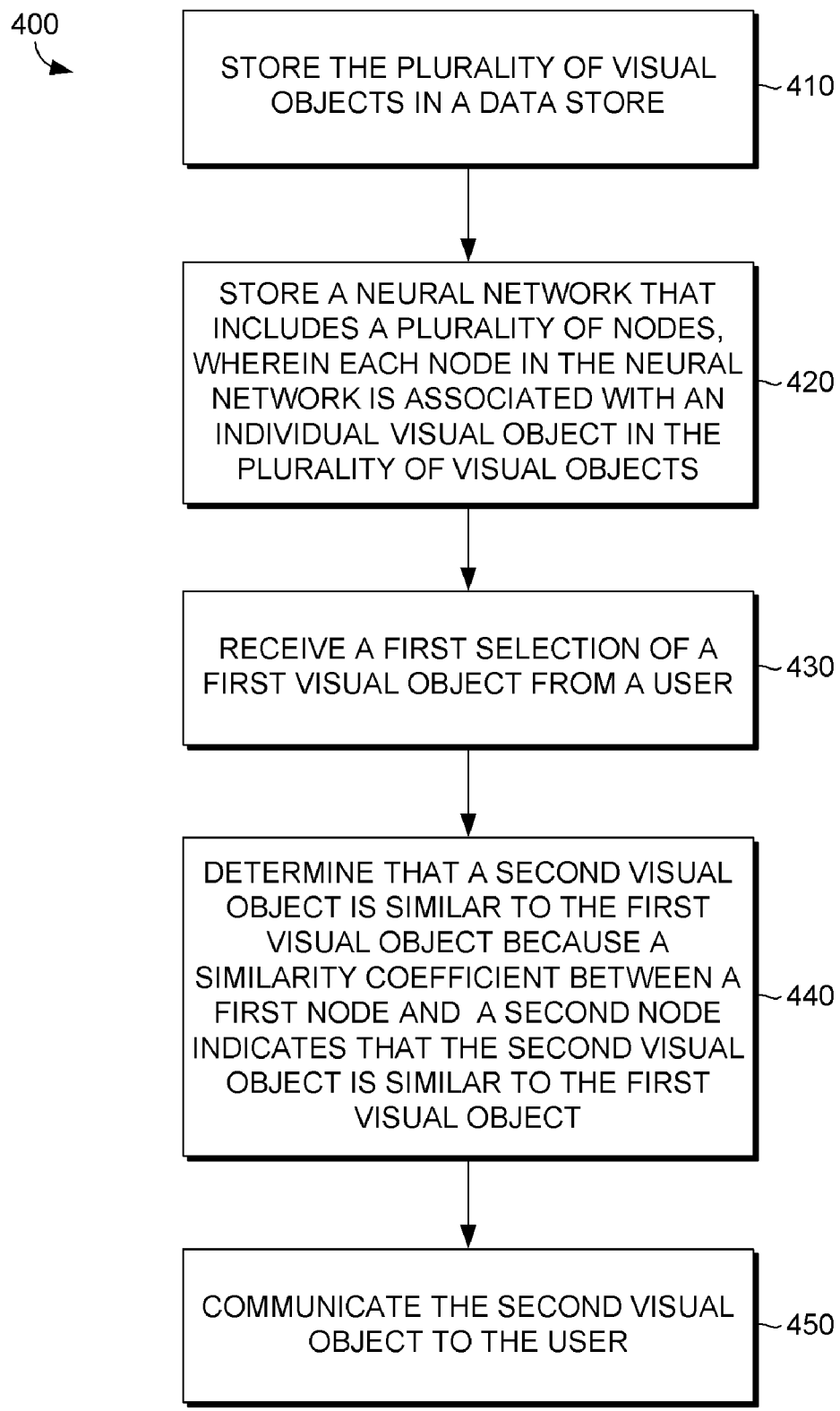
FIG. 4. is a flow diagram showing a method for finding similar visual objects within a plurality of visual objects in accordance with embodiments of the present invention.

Turning now to FIG. 4, a method for finding similar visual objects within a plurality of visual objects is shown, and designated generally with numeral 400. At step 410, a plurality of visual objects is stored in a data store. Each visual object within the data store may include an identifier and visual content. The identifier uniquely identifies an individual visual object. Examples of suitable identifiers include a unique name, a unique number, or a combination of letters and numbers. Visual content includes, but is not limited to, clip art, pictures, digital photographs, documents, and spreadsheets.

At step 420, a neural network that includes a plurality of nodes is stored. Each node in the neural network may correspond with an individual visual object stored in the data store. In one embodiment, the identifier associated with a visual object is included in information associated with the corresponding node. A node may include one or more similarity coefficients that indicate a degree of similarity between the node and another node. In reality, the similarity between nodes is a measure of the similarity between the visual objects corresponding to the nodes.

As stated, a similarity coefficient is associated with a current node and is measure of how similar the current node is to a target node. The current node may have several similarity coefficients associated with it that indicate how similar the current node is to various target nodes. For example, the current node could have a first similarity coefficient of 0.6 to a first target node, a second similarity coefficient of 0.3 to a second target node, and a third similarity coefficient of 0.1 to a third target node. Each of target nodes could, in turn, have similarity coefficients that indicated the degree of similarity with other nodes. The similarity coefficient is uni-directional, meaning that it measures the similarity of the current node to the target node, but not the target node to the current node. The target node could have a similarity coefficient to the present node that is greater or less than the similarity coefficient of the current node to the target node. For example, the first target node could have a similarity coefficient of 0.2 to the current node.

As described previously, the similarity coefficients for a node are determined using training sets built using training sets that describe user interactions with the visual objects associated with the nodes. The sum of the similarity coefficients for any node in the neural network must equal either a first number or zero. In one embodiment, the fixed number is one, but any other number could be used. The sum will be zero only if the node is not related to another node. In one embodiment, a node that is not similar to other nodes will not be associated with any similarity coefficients. In one embodiment, a higher similarity coefficient indicates a higher probability that the visual object corresponding to the first node is similar the visual object corresponding to the second node.

At step 430, a first selection of a first visual object is received from the user. The first visual object is one of the plurality of visual objects stored in the data store at step 410. In one embodiment, the selection is received over a user interface presented to the user on a web browser. At step 440, a second visual object is determined to be similar to the first visual object based on the similarity coefficient between a first node that corresponds to the first visual object and a second node that corresponds to the second visual object. In one embodiment, the first node is associated with several similarity coefficients. The second node is chosen because the similarity coefficient between the first node and the second node is the largest similarity coefficient associated with the first node. In another embodiment, a plurality of visual objects associated with nodes that have similarity coefficients associated with the first node are presented to the user. In this embodiment, all visual objects associated with a node that has a similarity coefficient above a threshold amount are presented. In another embodiment, up to a certain number of visual objects corresponding to nodes that have a similarity coefficient with the first node are presented. At step 450, the second visual object is communicated for presentation to the user. In one embodiment, the second visual object is communicated to a web-browser that presents the second visual object to the user.

Figure 5:
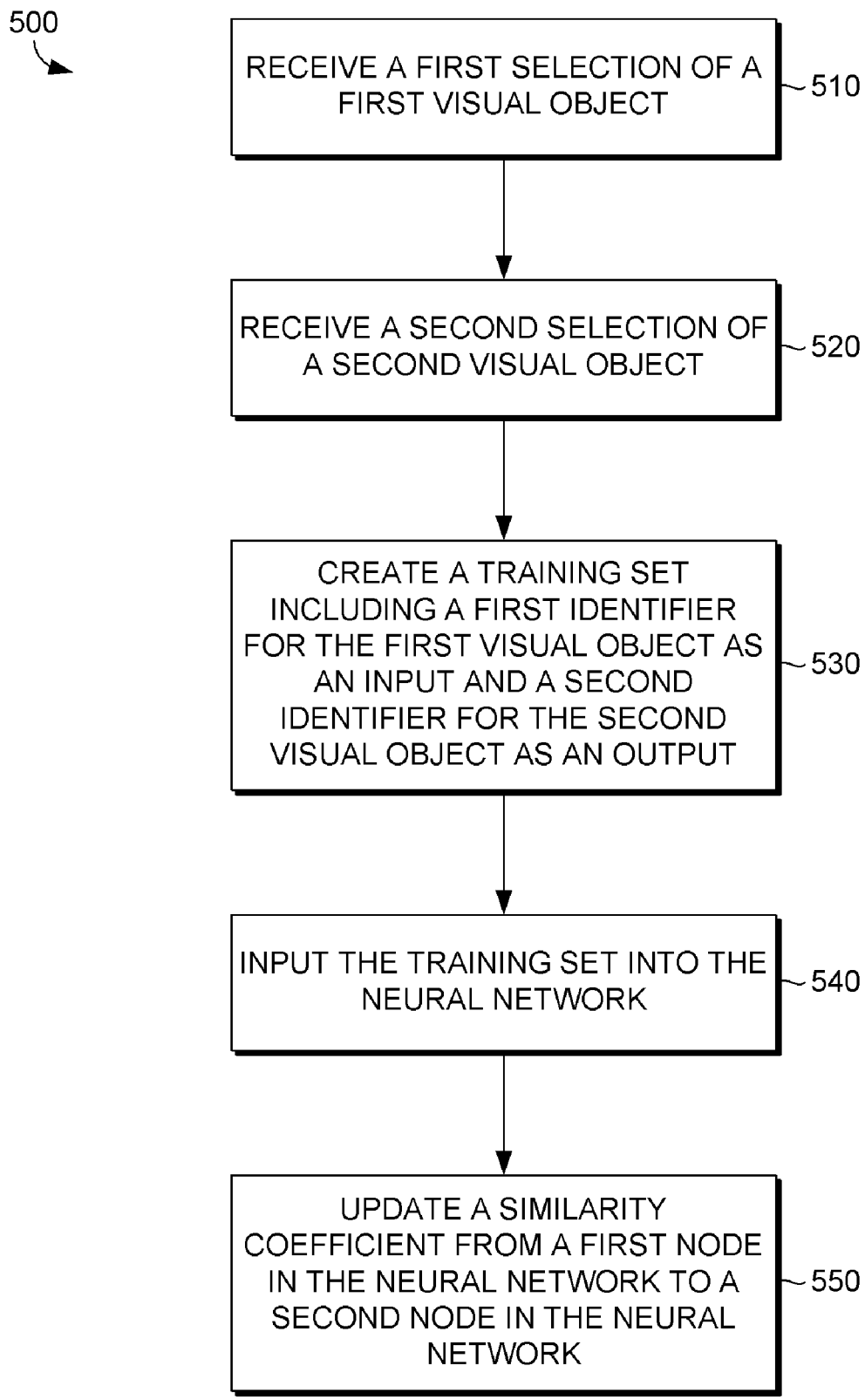
FIG. 5 is a flow diagram showing a method for training a neural network to determine that a first visual object is similar to a second visual object in accordance with embodiments of the present invention.

Turning now to FIG. 5, a method for training a neural network to determine that a first visual object is similar to a second visual object is shown and designated generally with numeral 500. At step 510, a first selection of the first visual object returned in response to a query is received. At step 520, a second selection of the second visual object that was returned in response to the same query is received. As described previously, a visual object may include visual content such as clip art, a digital photograph, a picture, a document, or a spreadsheet as well as identification information, keywords, and other information describing the visual object. The query may have been submitted over a user interface displayed to a user through a web browser. The first selection may be in the form of a user clicking a thumbnail or other icon representing the visual object. The visual object and a method of selection have been described previously.

At step 530, a training set is created. The training set includes a first identifier for the first visual object and a second identifier for the second visual object. The first identifier is an input and the second identifier is an output. As described previously, a training set may include the same number of inputs and outputs or different numbers of inputs and outputs.

At step 540, the input data from the training set is input into the neural network. The input set is run through an equation describing the neural network, which produces a calculated output. The calculated output is compared with the training output. If the training output deviates from the calculated output by more than an error threshold, then the similarity coefficients are updated until the calculated output deviates from the training output by less than the error threshold. Thus, the training may change the similarity coefficients associated with one or more nodes. At step 550, a first similarity coefficient from a first node in the neural network that corresponds to the first visual object is updated. The first similarity coefficient describes the similarity between the first node and the second node in the neural network. The second node corresponds to the second visual object. Updating the similarity coefficient between the first node and the second node in response to receiving this training set will increase the similarity coefficient so that the similarity between the first node and the second node is increased.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-readable media having computer-executable instructions embodied thereon for performing a method of finding similar visual objects within a plurality of visual objects, the method comprising:
   storing the plurality of visual objects in a data store, wherein each visual object within the plurality of visual objects includes an identifier and visual content;
   storing a neural network that includes a plurality of nodes, wherein each node in the neural network is associated with an individual visual object in the plurality of visual objects, and wherein each node includes at least one similarity coefficient that indicates a degree of similarity between the node and another node;
   receiving a first selection of a first visual object from a user, wherein the first visual object is one of the plurality of visual objects;
   determining that a second visual object is similar to the first visual object because a similarity coefficient between a first node and a second node indicates that the second visual object is similar to the first visual object, wherein the first node corresponds to the first visual object and the second node corresponds to the second visual object, and wherein the similarity coefficient is the highest similarity coefficient associated with the first node;
   communicating the second visual object for presentation to the user.

2. The media of claim 1, wherein the each visual object also includes keywords that describe the visual content.

3. The media of claim 2, wherein the method further includes:
   receiving a query from the user; and
   presenting one or more visual objects that are responsive to the query based on the keywords that are associated with the one or more visual objects, wherein the first visual object is included within the one or more visual objects.

4. The media of claim 1, wherein the each node includes the identifier for a visual object with which the each node is associated.

5. The media of claim 1, wherein the method further comprised receiving a plurality of identifiers from the neural network that correspond to a second plurality of visual objects that are similar to the first visual object based on similarity coefficients between nodes associated with the plurality of identifiers and the first visual object.

6. The media of claim 1, wherein a sum of similarity coefficients associated with a node in the neural network equals a first number or zero, wherein if the sum of the similarity coefficients equals zero the node is not related to a different node in the neural network.

7. The media of claim 6, wherein a high value for the similarity coefficient indicates a strong relationship between nodes in the neural network.

8. The media of claim 1, wherein the method further comprises:
   receiving a second selection of the second visual object from the user, wherein the second visual object is one of the plurality of visual objects;
   determining that a third visual object is similar to the first visual object and the second visual object because an aggregated similarity coefficient that is calculated by adding a first similarity coefficient between the first node and a third node with a second similarity coefficient between the second node and the third node indicates that the third visual object is similar to the first visual object and the second visual object, wherein the third node corresponds to the third visual object; and presenting the third visual object to the user.

9. A computerized system, including one or more computer-readable media, containing a two-layer neural network for finding similar visual objects within a plurality of visual objects, the system comprising:

the two-layer neural network containing a plurality of nodes that are linked by similarity coefficients, wherein the similarity coefficients in the two-layer neural network are updated using training pairs, wherein a training pair includes identification information for one or more input visual objects and the identification information for one or more output visual objects, and wherein the training pair is generated based on user interactions with the one or more input visual objects and the one or more output visual objects, and wherein:

(1) each node is associated with a visual object in a data store, and (2) a sum of the similarity coefficients associated with the each node must equal a first number or zero, wherein if the sum of the similarity coefficients is zero for a single node then the single node is not related to any other nodes in the two-layer neural network; and a similarity search component for:

(1) receiving a selection of one or more selected visual objects that are each associated with a corresponding node, (2) identifying one or more similar visual objects by evaluating the similarity coefficients associated with the each node associated with each of the one or more selected visual objects, and (3) causing the one or more similar visual objects to be presented to a user.

10. The system of claim 9, wherein the data store includes the plurality of visual objects that include visual content, keywords that describe the visual content, and identification information.

11. The system of claim 10, wherein the visual content includes one or more of:

a clip art, a picture, a digital photograph, a document, and a spreadsheet.

12. The system of claim 10, further including an alphanumeric search component for receiving an alphanumeric query from the user and identifying visual objects in the data store that are responsive to the alphanumeric query and causing identified visual objects to be presented to the user.

13. The system of claim 10, wherein a first plurality of similarity coefficients associated with a corresponding plurality of nodes in the two-layer neural network is calculated based on keywords associated with the plurality of visual objects.

14. A method for training a neural network to determine that a first visual object is similar to a second visual object, the method comprising:

receiving a first selection of the first visual object returned in response to a query;

receiving a second selection of the second visual object returned in response to the query, wherein the first visual object and the second visual object were determined to be responsive to the first query based on keywords associated with the first visual object and the second visual object;

creating a training set including a first identifier for the first visual object as an input and a second identifier for the second visual object as an output, wherein the training set is used to adjust a plurality of similarity coefficients associated with nodes in a neural network so that when the training set input is submitted to the neural network the neural network produces the training set output in response;

inputting the training set into the neural network; and updating a similarity coefficient from a first node in the neural network that corresponds to the first visual object to a second node in the neural network that corresponds to the second visual object, wherein the similarity coefficient is initially determined by using relationships identified by the keywords associated with the first visual object and the second visual object, wherein the similarity coefficient is updated using a reverse propagation algorithm, wherein a sum of the similarity coefficients associated with the first node equals a number, and wherein the sum of the similarity coefficients associated with all other nodes in the neural network equal the number or zero.

* * * * *